US011465611B2

(12) United States Patent
Hewitt et al.

(10) Patent No.: US 11,465,611 B2
(45) Date of Patent: Oct. 11, 2022

(54) AUTONOMOUS VEHICLE BEHAVIOR SYNCHRONIZATION

(71) Applicant: International Business Machines Corporation, Armonk, NY (US)

(72) Inventors: Trudy L. Hewitt, Cary, NC (US); Jeremy R. Fox, Georgetown, TX (US); Shikhar Kwatra, Durham, NC (US); Zachary A. Silverstein, Jacksonville, FL (US); Christian Compton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/778,626

(22) Filed: Jan. 31, 2020

(65) Prior Publication Data

US 2021/0237714 A1 Aug. 5, 2021

(51) Int. Cl.
*B60W 30/02* (2012.01)
*G06N 5/02* (2006.01)
*G05D 1/00* (2006.01)
*B60W 50/00* (2006.01)

(52) U.S. Cl.
CPC .......... *B60W 30/025* (2013.01); *B60W 50/00* (2013.01); *G05D 1/0088* (2013.01); *G06N 5/02* (2013.01); *B60W 2050/0028* (2013.01); *B60W 2552/00* (2020.02); *B60W 2555/20* (2020.02)

(58) Field of Classification Search
CPC .............. B60W 30/025; B60W 50/00; B60W 2050/0028; B60W 2552/00; B60W 2555/20; B60W 2040/809; B60W 2556/10; B60W 60/0013; G05D 1/0088; G06N 5/02
See application file for complete search history.

(56) References Cited

U.S. PATENT DOCUMENTS

| | | | |
|---|---|---|---|
| 9,932,035 B1 | 4/2018 | Ferguson et al. | |
| 10,202,117 B2 | 2/2019 | Gordon et al. | |
| 10,275,959 B2 | 4/2019 | Ricci | |
| 2016/0117926 A1* | 4/2016 | Akavaram | B62D 15/0285 |
| | | | 340/932.2 |
| 2017/0200367 A1* | 7/2017 | Mielenz | G05D 1/0212 |
| 2017/0267256 A1 | 9/2017 | Minster et al. | |
| 2017/0274908 A1* | 9/2017 | Huai | G05D 1/0221 |
| 2017/0297586 A1 | 10/2017 | Li | |
| 2018/0170392 A1* | 6/2018 | Yang | G01C 21/3679 |
| 2019/0047584 A1 | 2/2019 | Donnelly | |
| 2019/0101922 A1 | 4/2019 | Matsumura | |
| 2019/0185012 A1 | 6/2019 | Zheng et al. | |
| 2019/0259277 A1* | 8/2019 | Dudar | G01C 21/3469 |
| 2021/0179125 A1* | 6/2021 | Vardharajan | B60W 50/0098 |
| 2022/0034678 A1* | 2/2022 | Chintakindi | G01C 21/3484 |

* cited by examiner

*Primary Examiner* — Marthe Y Marc-Coleman
(74) *Attorney, Agent, or Firm* — Terrile, Cannatti & Chambers, LLP; Emmanuel A. Rivera (57) ABSTRACT

A method, system and computer-usable medium are disclosed for autonomous vehicle (AV) behavior synchronization. The AV driving pattern is adjusted to facilitate an occupant's satisfaction by receiving information as to person to form a driving history. The driving history is analyzed to identify preferences and patterns. Based on the driving history a driving preference model is formed for the person. AV driving algorithm(s) are adjusted based on the driving preference model for the person when the person is an occupant of the AV.

20 Claims, 5 Drawing Sheets

AUTONOMOUS VEHICLE BEHAVIOR SYNCHRONIZATION

BACKGROUND OF THE INVENTION

Field of the Invention

The present invention relates in general to the field of computers and similar technologies, and in particular to software utilized in this field. Still more particularly, it relates to a method, system and computer-usable medium for autonomous vehicle behavior synchronization.

Description of the Related Art

Autonomous vehicles or AVs are classified by the Society of Automotive Engineers (SAE) and National Highway Traffic Safety Administration (NHTSA) as "level 0" with no automation, where the driver is in complete control of the vehicle at all times. "Level 1" where there is driver assistance, the vehicle can assist the driver or take control of either the vehicle's speed, through cruise control, or its lane position, through lane guidance. The driver must monitor the vehicle and road at all times and must be ready to take control at any moment, with hands on the steeling wheel and feet on or near the pedals. "Level 2" where there is occasional self-driving. The vehicle can take control of both the vehicle's speed and lane position in some situations, for example on limited-access freeways. The driver may disengage, with hands off the steering wheel and feet away from the pedals but must monitor the vehicle and road at all times and be ready to take control at any moment. "Level 3" where there is limited self-driving. The vehicle is in full control in some situations, monitors the road and traffic, and will inform the driver when he or she must take control. When the vehicle is in control the driver need not monitor the vehicle, road, or traffic but must be ready to take control when required. "Level 4" where there is full self-driving under certain conditions. The vehicle is in full control for the entire trip in these conditions, such as urban ride-sharing. The vehicle can operate without a driver in these conditions; the driver's only role is to provide the destination. "Level 5" where there is full self-driving under all conditions. The vehicle can operate without a human driver or occupants.

Fully autonomous vehicles (AVs), such as those classified under Level 4 or 5, can provide a great benefit to society and change the lives people in many ways. Drivers/passengers can use their time in a vehicle to use the Internet, read, work, eat, sleep, etc. An AV can transport people that could not otherwise drive or transport themselves. An AV can take someone to work and then return home by itself to take children to school. In urban areas, if an autonomous car can be summoned when wanted, there will be little need for some individuals to own a car. Traffic congestion can decrease. Fewer parking spaces may be needed. Land use patterns likely would change.

Many are capable of some level of automated operation, and prototype cars capable of driving autonomously have been, and continue to be, tested on public roads. These technologies have arrived rapidly on the market and their future deployment is expected to accelerate. As discussed, autonomous driving promises many benefits: improved safety, reduced congestion and lower stress for car occupants, among others. Authorities will have to adapt existing rules and create new ones in order to ensure the full compatibility of these vehicles with the public's expectations regarding safety, legal responsibility and privacy.

AVs come pre-configured with a base set of algorithms used to operate the vehicle in traffic. With both basic operations like stopping at stop signs, or adaptive cruise control, these operations making driving simpler. These AVs can present a problem when their pre-programmed behaviors deviate from the preferences of the user, for example taking turns too quickly or avoiding objects based on the preferences of the users. Differences exist as to the choices made by a driver and the algorithms that dictate how an autonomous vehicle operates. Reconciling this would increase the satisfaction, experience, and riders' usability factor pertaining to the overall satisfaction of the autonomous vehicle experience.

SUMMARY OF THE INVENTION

A method, system and computer-usable medium are disclosed for autonomous vehicle (AV) behavior synchronization. The AV driving pattern is adjusted to facilitate an occupant's satisfaction by receiving information as to person to form a driving history. The driving history is analyzed to identify preferences and patterns. Based on the driving history a driving preference model is formed for the person. AV driving algorithm(s) are adjusted based on the driving preference model for the person when the person is an occupant of the AV.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

A system, method, and computer-readable medium are disclosed for autonomous vehicle behavior synchronization. Described herein a system, method, and computer-readable medium to monitor how a user drives and adopt these contextual patterns during daily driving. An autonomous vehicle (AV) make decisions, and recognize patterns in behavior, accounting for the priority of choices made by the user/driver. For example, if a vehicle has been recently washed, a user or driver have driving patterns to avoid puddles, or avoid parking under trees (i.e., to avoid birds/pollen/etc.). However, if a vehicle was washed, and it was raining, the driver would not worry about puddles. If the vehicle had not been washed in a while, the driver would be less hesitant to park under trees and avoid getting the vehicle dirty.

For purposes of this disclosure, an information processing handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
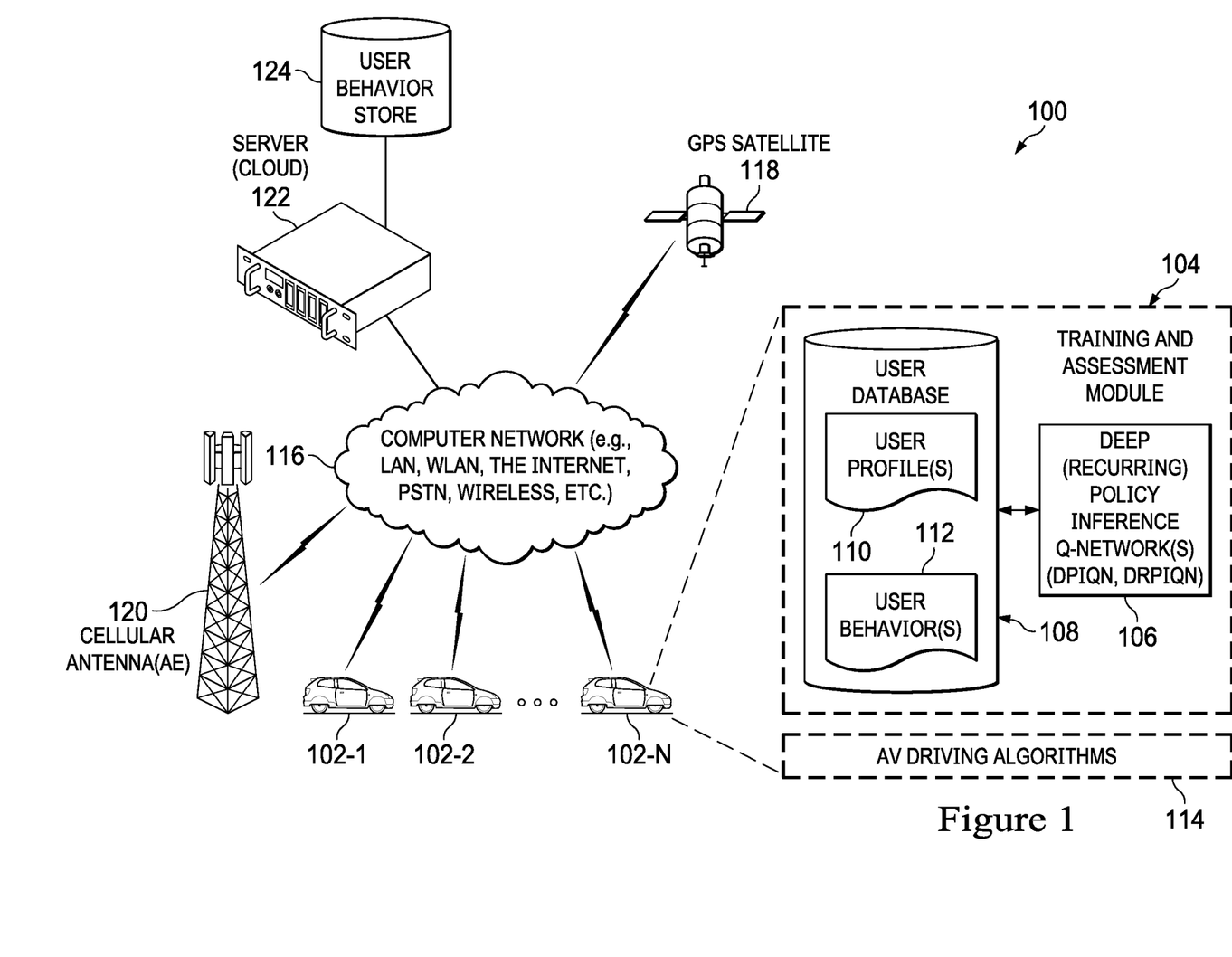
FIG. 1 depicts a network environment that includes autonomous vehicles that are implemented for behavior synchronization.

FIG. 1 shows a network environment that includes autonomous vehicles that are implemented for behavior synchronization. The network environment 100 includes multiple autonomous vehicles (AV) 102-1, 102-2 to 102-N. AVs 102 are classified to have some level of autonomous driving, including full self-driving. However, it is expected than during learning operation in determining driving patterns of individual persons, control of driving is provided to the individual driver. The AVs 102 include personal vehicles, ride-share vehicles, public vehicles, etc. Furthermore, the AVs 102 can include various types of vehicles, such as compact personal automobiles, ride share vehicles, vans, busses, etc.

In certain implementations, the AVs 102 are configured with a training and assessment module 104. The training and assessment module 104 includes deep (recurring) policy inference Q-networks (DPIQN and DRPIQN networks) 106. The training and assessment module 104, and DPIQN and DRPIQN networks 106 are implemented to determine driving behaviors and driving profiles of users or drivers, which are stored in a user database 108. In particular, the user database 108 includes user profile(s) 110 and user behavior(s) 112. The training and assessment module 104, and DPIQN and DRPIQN networks 106 are further described below, as well as the process of determining the user profile(s) 110 and user behavior(s) 112. In certain implementations, user behavior(s) 112 are adjusted per the type of AV 102, such as for a personal automobile, van, ride share vehicle, bus, etc.

AVs 102 further include AV driving algorithms 114. The AV driving algorithms 114 are embedded in hardware and/or software of AVs 102. The AVs 102 hardware includes sensors to obtain data about the AVs 102 environment, vehicle-to-vehicle and vehicle-to-infrastructure communication technologies to exchange information with other connected vehicles and infrastructure, and actuators (e.g., steering wheel, brakes, simulators, etc.) to execute the AVs 102 physical movements These hardware components interact with the AVs 102 software, which comprises perception, decision-making (or planning) and control. Sensors can include and are not limited to video, radar, sonar, LIDAR, and other types of environmental data gathering sensors.

Perception refers to the collection of information and knowledge from the environment by the AVs 102 system through sensors and communication networks. Decision-making enables the AVs 102 to meet goals through processes including mission planning that involves decision-making to meet "high-level objectives" such as deciding which route to take, planning that involves producing "local objectives" such as switching lanes and overtaking, and motion (or local) planning that produces the steps required to achieve local objectives, such as reaching a target destination. AV driving algorithms 114 make decisions based on selected preferences and criterion; and control algorithms execute these decisions by calculating the inputs for the AVs 102 actuators, such as the steering angle and vehicle speed, for the AVs 102 to follow a given trajectory. The proper functioning of AV driving algorithms 114 in all software and hardware components is critical for safe operation of AVs 102.

In an embodiment, AVs 102 are connected to a network 116. The network 116 can include local network connections and remote connections in various embodiments, such that AVs 102 may operate in environments of any size, including local and global, e.g., the Internet. In certain embodiments, the location information is determined through the use of a Geographical Positioning System (GPS) satellite 118 and/or cellular antenna(ae) 120.

In certain embodiments, user behaviors, such as user behavior(s) 112 are sent to a server or cloud service 122 and stored in nonvolatile data user behavior store 124. In certain implementations, the user behavior stored in user behavior store 124 is accessed and downloaded by various AVs 102, and not necessarily the AV 102 providing the particular user behavior. For example, if a user purchases a different AV 102, it may be desirable to download the user's user behavior to new AV 102, and the AV driving algorithms 114 can be adjusted accordingly. Another example is the case of ride sharing where multiple users are using the same AV 102. The ride sharing AV can download the user behaviors of the users in the ride sharing AV 102, and the AV driving algorithms can be adjusted based on the user behaviors.

In certain embodiments, the AVs 102 include an information processing handling system. An illustrative example of an information processing handling system showing an exemplary processor and various components commonly accessed by the processor is shown in FIG. 2.

Figure 2:
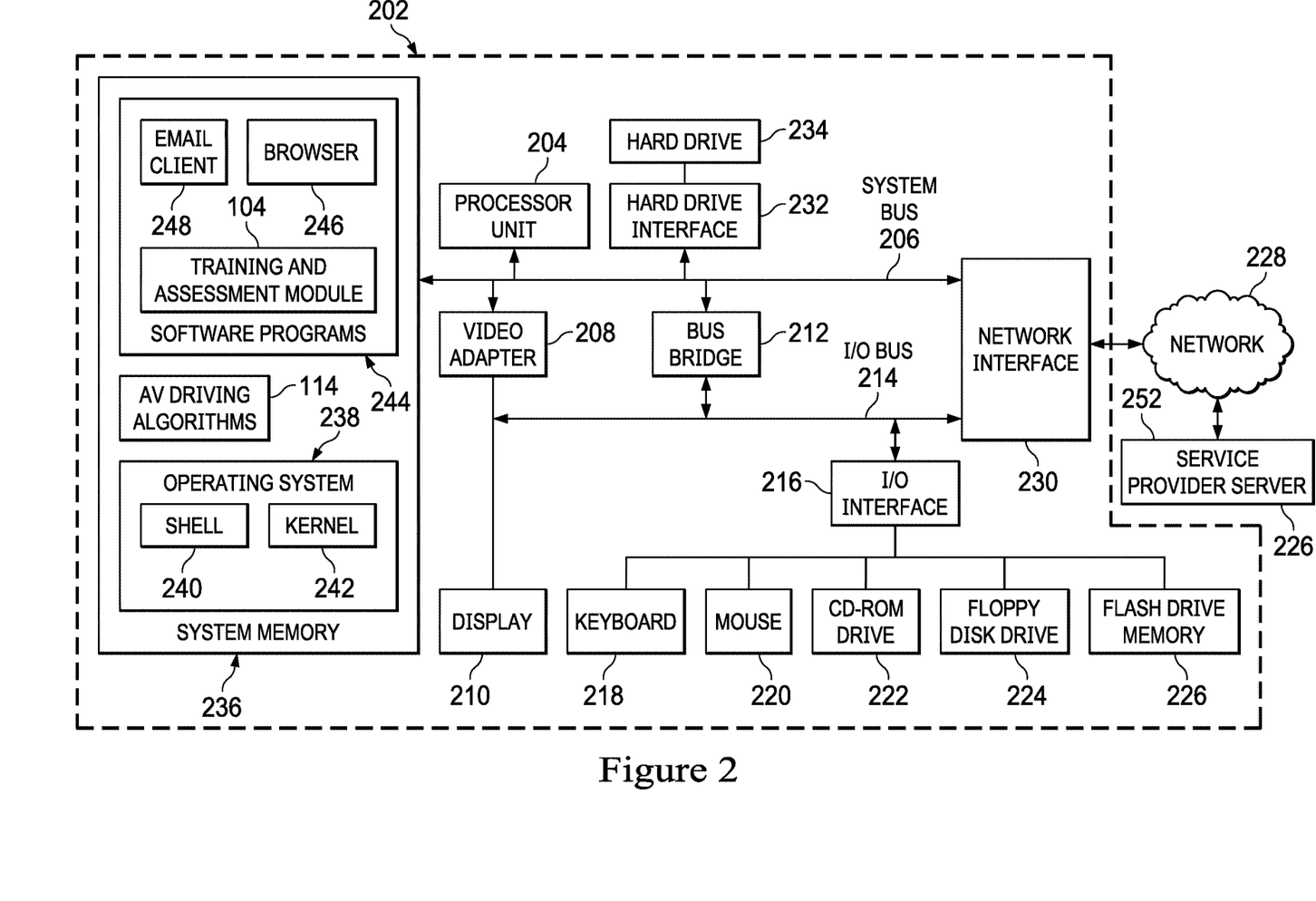
FIG. 2 depicts a simplified block diagram of an information handling system capable of performing computing operations.

FIG. 2 illustrates an information processing handling system 202, more particularly, a processor and common components, which is a simplified example of a computer system capable of performing the computing operations described herein. Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 252 via a network 228 (e.g., network 116) using a network interface 230, which is coupled to system bus 206. Network 228 may be an external network such as the Internet, or an internal network such as an Ethernet Network or a Virtual Private Network (VPN).

A hard drive interface 232 is also coupled to system bus 206. Hard drive interface 232 interfaces with a hard drive 234. In an embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 252. In various embodiments, software programs 244 may also include training and assessment module 104. In these and other embodiments, the invention 250 includes code for implementing the processes described hereinbelow. In one embodiment, the information processing information handling system 202 is able to download training and assessment module 104 from a service provider server 252. In certain implementations, system memory 236 includes AV driving algorithms 114.

The hardware elements depicted in the information processing information handling system 202 are not intended to be exhaustive, but rather are representative to highlight components used by the present invention. For instance, the information processing information handling system 202 may include alternate memory storage devices. These and other variations are intended to be within the spirit, scope and intent of the present invention.

Figure 3:
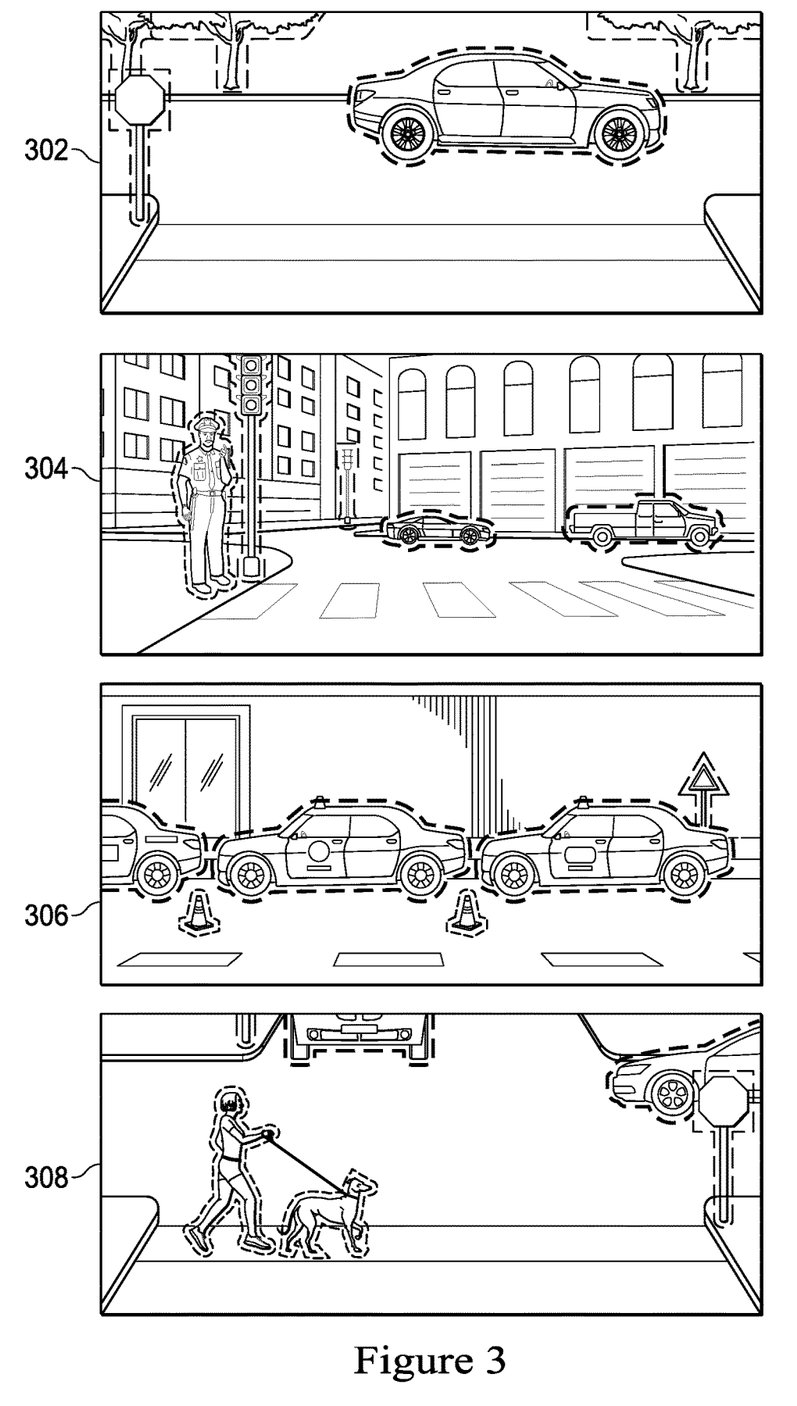
FIG. 3 depicts data frames of a track from a user driving a vehicle.

FIG. 3 shows example frames of a track from a user driving a vehicle. Frames 302, 304, 306, and 308, are visualized data that are part of a sequence that tracks driving behavior of a user/driver. In particular, the environment of the AV 102 is tracked as a user/driver performs driving of the AV 102. Environmental data is tracked as represented by frames 302, 304, 306, and 308.

In certain implementations, the frames 302, 304, 306, and 308 are visualized data are created from LIDAR data projected into aligned camera data for visualization. Particular objects, such as other cars, pedestrians, stationary objects, bicycles, etc. are identified in frames 302, 304, 306, and 308. Other environmental data or information can also be identified in frames 302, 304, 306, and 308, such as temperature, humidity, daylight, etc. As discussed above, AVs 102 can include environmental data gathering sensors, such as those directed to video, radar, sonar, LIDAR, and other types of environmental data.

Figure 4:
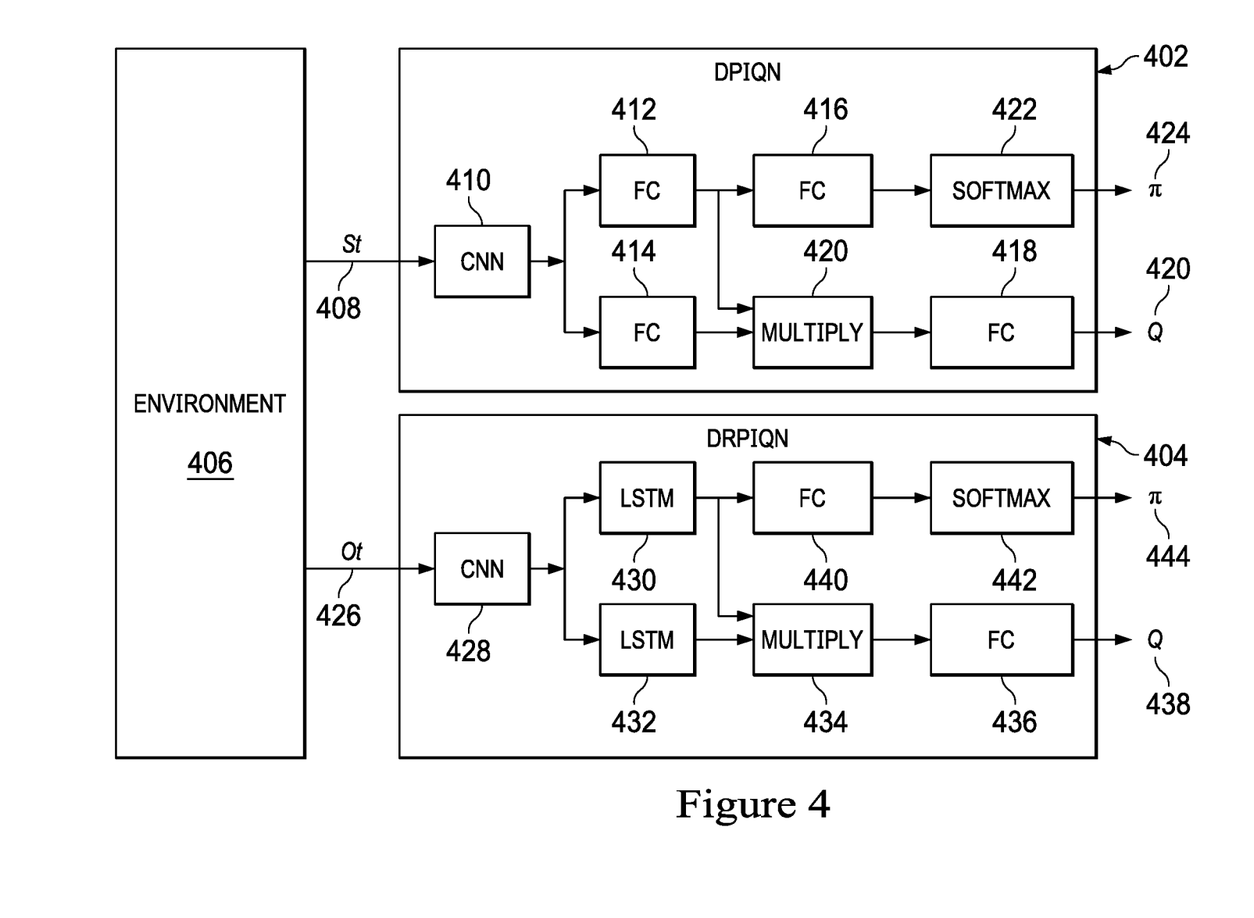
FIG. 4 depicts a deep policy inference Q-network (DPIQN) and deep recurring policy inference Q-network (DRPIQN)

FIG. 4 shows a deep policy inference Q-network (DPIQN) and deep recurring policy inference Q-network (DRPIQN). In certain implementations, DPIQN 402 and DRPIQN 404 are included in training and assessment module 104. As described, training and assessment module 104 includes deep (recurring) policy inference Q-networks (DPIQN and DRPIQN networks) 106.

Environment 406 is monitored, where input from environment 406 or $S_t$ 408 is received by a convolutional neural network (CNN) 410 of the DPIQN 402. Fully connected layers (FC) 412, 414, 416 and 418 classify features. Output of FC 412 and FC 414 are multiplied 420 (i.e., scale the value of nodes of the CNN 410 with connection weighting factors) and the output is provided to FC 418 which provides an input to a model/equation Q 420. Softmax layer 422 is a final layer before the output layer that computes the probability of all possible class outcomes. A definite outcome value given an input or 7C 424 is provided. Other input from the environment or Ot 426 is received by a convolutional neural network (CNN) 428 of the DRPIQN 404. The output of CNN 428 is received by long short-term memory (LSTM) artificial recurrent neural network (RNN) LSTM 430 and LSTM 432. Outputs of the LSTM 430 and LSTM 432 are multiplied at 434 and provided to FC 436 which provides an input to a model/equation Q 438. The output of LSTM 430 is received by an FC 436. Output of FC 440 is passed to Softmax layer 442 which outputs a definite outcome value given an input or 7C 444.

In certain implementations, the DPIQN 402 is semi-supervised reinforcement learning module for multi-agent systems. Semi-supervised refers to a model which involved both "labeled" and "unlabeled" training data. Labeled data are inputs that are explicitly classified with the desired outcome (i.e. the preferences of the user). Agent refers to anything that can make a decision, such as live users or system that provides user-preference data to make a decision.

In certain implementations, the DPIQN 402 is triggered and recognizes several frames of track, such as frames described above in FIG. 3, of a user driving a vehicle (i.e., AV 102). The DPIQN 402 can infer the nature or style of remaining frames by deriving user's heuristics and patterns. A sample set of frames/data is sufficient to determine driving behavior; however, the more frames/data that are available (i.e. labeled input and output data, the more accurate is the model. Therefore, there is a possibility through the use of the DPIQN 402 to include additional datasets that address changes in pose, occlusion level, viewing distance, different maneuvers, etc. that are learned on the fly and added to a user's policy. In certain implementations, the DPIQN 402 is enhanced with DRPIQN 404 to cope with partial observability. Both DPIQN 402 and DRPIQN 404 are learned by adapting network's attention to policy features and their own Q-values at various stages of the training process.

User's heuristics/patterns corresponding to said contextual situations based on variations in environment variables are tracked by the AV over a temporal duration D. The AV 102 system initiates the training for a user "U" by understanding the cognitive heuristics and ingesting the user's driving mode/attributes in the deep policy inference Q-network (DPIQN).

In certain implementations, the training and as training and assessment module 104 is configured to perform the following. The following are determined: policy network (i.e., model that gives definite output from specific input factors), trust region (i.e., optimization technique for solving nonlinear problems), agents, trajectories, variables, etc.

- Initialize parameters of a policy network $\theta$, and trust region size $\Delta$
- Generate trajectories for all agents as $\tau \sim \pi \theta_i$ (where $\tau$ is policy network using policy with shared parameters.
- DPIQN is learned by adapting network's attention to policy features and their own Q-values at various stages of the training process
- Search $\pi$ ($\theta[i+1]$) that maximizes the reward based on policy network and trust region for a user/agent in order to replicate a similar pattern as exhibited by the agent.
- Pearson correlation is used to derive a step-by-step association b/w the learned policy and the agent's heuristics.
- Positive correlation (i.e. limit approaching a positive value), indicating a positive user association which is directly proportional to the user's satisfaction rate and negative correlation implies retraining the system based on a new environment variable/state observed by the module.
  - positive satisfaction rate (emotion API correlates with AV driving maneuver)
  - negative satisfaction rate (driving maneuver needs alteration)→iteration x[ ] (i.e., feed forward and feed backward data regarding the outcome for the model for a specific iteration).

Figure 5:
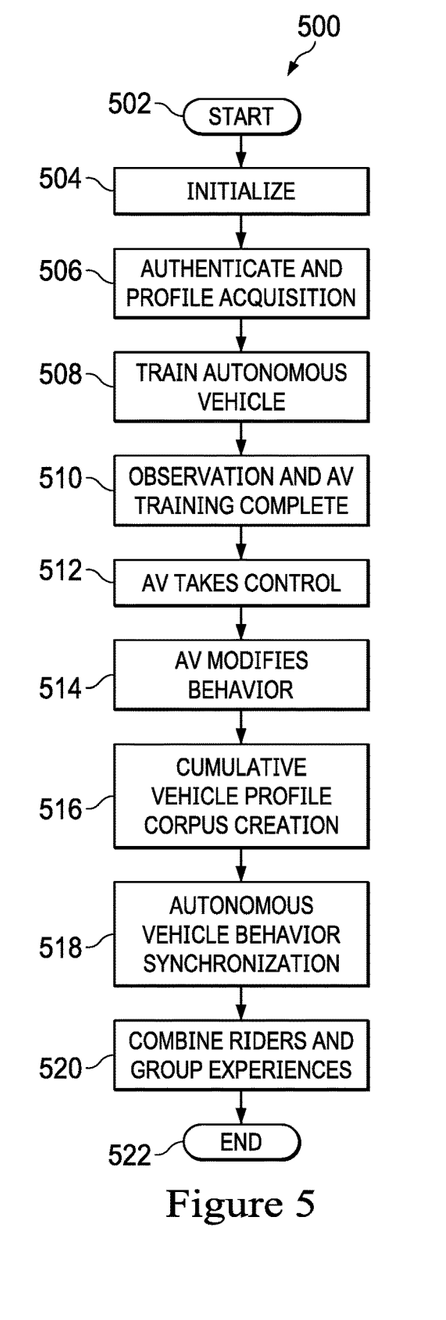
FIG. 5 is a generalized flowchart of the operation of identification of product and software updates tailored to devices according to a selection criterion.

FIG. 5 is a generalized flowchart 500 for profiling a user/driver based on a classification of the user/driver profile class. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, the process 500 starts. At step 504, initialization is performed. Initialization can be by through a user entering an AV 102 and starting the AV 102. At step 506, authentication and profile acquisition is performed. The AV 102 recognizes the user's unique profile through one of various authentication means, such as bioinformatic methods that include facial recognition, etc. At step 508, training the autonomous vehicle is performed. As the AV 102 starts to observe the user's behaviors, the AV 102 learns the unique habits and behaviors for the user. The AV 102 system is training the model for future customization at this point as described above as to the training and assessment module 104.

At step 510, observation and vehicle training is completed. Over a period of time, the AV 102 will understand the user's profile and is properly trained on the level of customization required to employ unique qualifications to the user/driver. Therefore, the AV 102 is able to take control and adjust driving algorithms 114 to suit the user/driver.

At step 512, the autonomous vehicle takes control. The AV 102 continuously is made aware of the user, who is now a rider, and the rider's experience (profile) and driving is adjusted appropriately. For example, if the rider's stress level is being quantified, the AV 102 can ameliorate the ability to customize the riding experience if the driving experience falls within acceptable levels given the qualification for driving ranges. For example, during acceleration of the AV 102, if the rider "asks" the AV 102 to slow down during the initial acceleration after lights are turning green, then the rider may feel that the AV 102 might be accelerating too fast. For example, during a pedestrian observation experience, the rider may feel that the AV 102 is getting too close to pedestrians and this is making the rider very nervous inside the vehicle. The rider "asks" the vehicle to stay further away from pedestrians.

At step 514, the autonomous vehicle modifies behavior. The AV 102 will change and employ modifications based on training and assessment module 104 as to customization patterns that the rider is instructing the AV 102 on given the situations that occur within normal driving situations of AV 102. This will allow the AV 102 riding experience to become more tailored to the rider's typical traditional driving experience.

At step 516, cumulative vehicle (user) corpus creation is performed. As described in FIG. 1, a server 122 which can be representative of cloud based service can be implemented to gather user behavior, which provide data as to the unique habits and customization levels of riders as provided by the various training and assessment modules 104. The unique user behaviors 112 and user profiles 110 can be provided for riders wherever they go. For example, if a user buys a new AV 102 and trades in their old AV 102, their unique user behavior 112 and user profile 110 can be downloaded to the new AV 102. Furthermore, their user behavior 112 and user profile 110 can be revised and updated.

At step 518, autonomous vehicle behavior synchronization is performed. This step allows for AVs 102 to be uniquely paired to a rider's likes, and unique requirements (within reason and safety ranges) to have the riding experience tailored to the rider.

At step 520, combined riders and group based experiences are performed. When multiple riders are sharing an AV 102, the AV 102 can tailor the group-based experience to collected aggregated (average) experience when it comes to driving acts such as acceleration, steering sensitivity, braking, and overall riding experience. The AV 102 takes into consideration all the riders within the AV 102 and tailors a group-based experience that is conducive to all the riders within the AV 102. For example, this can take place for groups of people such as co-workers riding together, families, tour buses, uber ride sharing, etc. At block 522, the process 500 ends.

Figure 6:
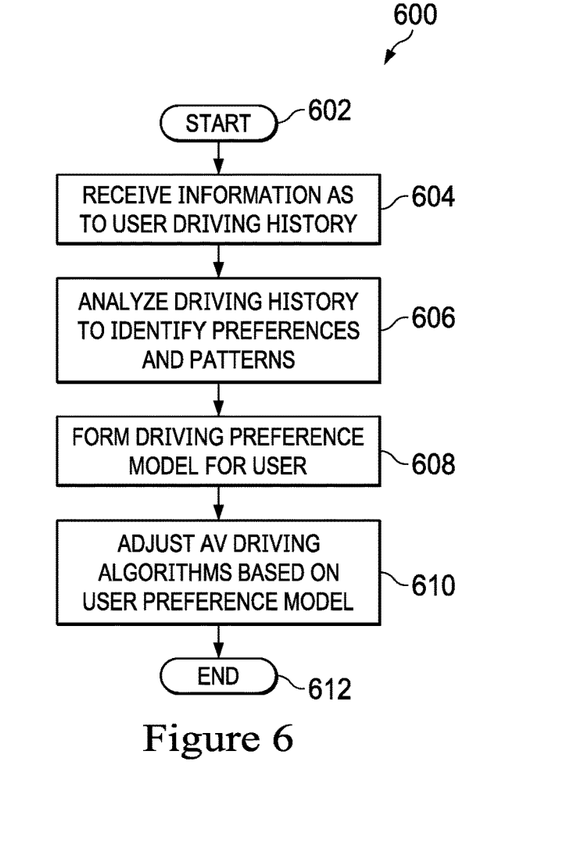
FIG. 6 is a generalized flowchart of the operation adjusting an Autonomous Vehicle (AV) driving pattern to facilitate an occupant's satisfaction.

FIG. 6 is a generalized flowchart 600 for adjusting an Autonomous Vehicle (AV) driving pattern to facilitate an occupant's satisfaction. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, the process 600 starts. At step 604, information is received as to user driving history. In certain implementations, the training and assessment module 102 performs this step. In certain implementations, information about the person is received based on monitoring the person, road conditions, weather, and traffic condition while the person is driving a plurality of AVs 102.

At step 606, driving history is analyzed to identify preferences and patterns. In certain implementations, the training and assessment module 102 performs this step. At step 608, driving preference model is formed as to the user. The driving preference model is presented by user profile 110 and user behavior 112. In certain implementations, the preference model is continuously adjusted based on feedback of the person during driving experiences.

At step 610, autonomous vehicle (AV) driving algorithms are adjusted based on the user preference models. User profile 110 and user behavior 112 are used to adjust the AV driving algorithms. In certain implementations, adjusting the AV driving algorithms considers at least two occupant's driving preferences. At block 612, the process 600 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for adjusting an Autonomous Vehicle (AV) driving algorithm to facilitate an occupant's satisfaction comprising:
   receiving information about a person to form a driving history;
   analyzing the driving history to identify preferences and patterns using a deep policy inference Q-network (DPIQN) that receives input from driving environment of the driving history and a deep recurring policy inference Q-network (DRPIQN) that receives other input from the driving environment of the driving history;
   forming a driving preference model for the person; and
   adjusting the AV driving algorithm based on the driving preference model for the person when the person is an occupant of the AV, wherein the AV driving algorithm considers the driving preferences of at least two occupants of the AV.

2. The computer implemented method of claim 1, wherein the information about the person is received based on monitoring the person, road conditions, weather, and traffic condition while the person is driving a plurality of AVs.

3. The computer implemented method of claim 1 further comprising adjusting the AV driving algorithm considering at least two occupant's driving preferences.

4. The computer implemented method of claim 1, wherein the AV chooses a parking spot based on a condition of the AV.

5. The computer implemented method of claim 1, wherein the driving preference model is made available to other AVs.

6. The computer implemented method of claim 1, wherein the driving preference model is continuously adjusted based on feedback of the person during driving experiences.

7. The computer implemented method of claim 1 further comprising authenticating the person.

8. A system comprising:
   a processor;
   a data bus coupled to the processor; and
   a computer-usable medium embodying computer program code, the computer-usable medium being coupled to the data bus, the computer program code used for adjusting an Autonomous Vehicle (AV) driving algorithm to facilitate an occupant's satisfaction comprising instructions executable by the processor and configured for:
   receiving information about a person to form a driving history;
   analyzing the driving history to identify preferences and patterns using a deep policy inference Q-network (DPIQN) that receives input from driving environment of the driving history and a deep recurring policy inference Q-network (DRPIQN) that receives other input from the driving environment of the driving history;
   forming a driving preference model for the person; and
   adjusting the AV driving algorithm based on the driving preference model for the person when the person is an occupant of the AV, wherein the AV driving algorithm considers the driving preferences of at least two occupants of the AV.

9. The system of claim 8, wherein the information about the person is received based on monitoring the person, road conditions, weather, and traffic condition while the person is driving a plurality of vehicles.

10. The system of claim 8 further comprising adjusting the AV driving algorithm considering at least two occupant's driving preferences.

11. The system of claim 8, wherein the AV chooses a parking spot based on a condition of the vehicle being.

12. The system of claim 8, wherein the driving preference model is made available to other AVs.

13. The system of claim 8, wherein the driving preference model is continuously adjusted based on feedback of the person during driving experiences.

14. The system of claim 8 further comprising authenticating the person.

15. A non-transitory, computer-readable storage medium embodying computer program code, the computer program code comprising computer executable instructions configured for:
   receiving information about a person to form a driving history;
   analyzing the driving history to identify preferences and patterns using a deep policy inference Q-network (DPIQN) that receives input from driving environment of the driving history and a deep recurring policy inference Q-network (DRPIQN) that receives other input from the driving environment of the driving history;
   forming a driving preference model for the person; and
   adjusting the AV driving algorithm based on the driving preference model for the person when the person is an occupant of the AV, wherein the AV driving algorithm considers the driving preferences of at least two occupants of the AV.

16. The non-transitory, computer-readable storage medium of claim 15, wherein the information about the person is received based on monitoring the person, road conditions, weather, and traffic condition while the person is driving a plurality of vehicles.

17. The non-transitory, computer-readable storage medium of claim 15, wherein the driving preference model is made available to other AVs.

18. The non-transitory, computer-readable storage medium of 17, wherein the driving preference model is continuously adjusted based on feedback of the person during driving experiences.

19. The non-transitory, computer-readable storage medium of 15, further comprising adjusting the AV driving algorithm considering at least two occupant's driving preferences.

20. The non-transitory, computer-readable storage medium of 15, further comprising authenticating the person.

* * * * *